US008805356B2

(12) United States Patent
Guedalia et al.

(10) Patent No.: US 8,805,356 B2
(45) Date of Patent: Aug. 12, 2014

(54) TELECOMMUNICATION CALL SUPPORT FOR MOBILE DEVICES WITH PRESENCE FEATURES

(71) Applicant: Qualcomm iSkoot, Inc., San Diego, CA (US)

(72) Inventors: Isaac David Guedalia, Bet Shemesh (IL); Jacob Guedalia, San Diego, CA (US)

(73) Assignee: Qualcomm Connected Experiences, Inc., San Diego, CA (US)

( * ) Notice: Subject to any disclaimer, the term of this patent is extended or adjusted under 35 U.S.C. 154(b) by 0 days.

(21) Appl. No.: 13/750,859

(22) Filed: Jan. 25, 2013

(65) Prior Publication Data
US 2013/0137421 A1    May 30, 2013

Related U.S. Application Data

(60) Division of application No. 12/135,420, filed on Jun. 9, 2008, now Pat. No. 8,391,848, which is a continuation-in-part of application No. 12/130,419, filed on May 30, 2008, and a continuation-in-part of application No. 11/948,404, filed on Nov. 30, 2007.

(60) Provisional application No. 60/947,963, filed on Jul. 4, 2007, provisional application No. 60/942,557, filed on Jun. 7, 2007.

(51) Int. Cl.
| H04W 24/00 | (2009.01) |
| H04M 15/00 | (2006.01) |
| H04W 24/04 | (2009.01) |
| H04W 48/08 | (2009.01) |
| H04W 8/26  | (2009.01) |
| H04W 48/16 | (2009.01) |
| H04W 76/02 | (2009.01) |

(52) U.S. Cl.
CPC ......... *H04W 24/04* (2013.01); *H04W 8/26* (2013.01); *H04M 15/00* (2013.01); *H04W 48/08* (2013.01); *H04W 48/16* (2013.01); *H04W 76/02* (2013.01)
USPC ........................................................ 455/423

(58) Field of Classification Search
USPC ........................................................ 455/423
See application file for complete search history.

(56) References Cited

U.S. PATENT DOCUMENTS

| 4,751,728 A | 6/1988 | Treat |
| 4,799,253 A | 1/1989 | Stern et al. |

(Continued)

FOREIGN PATENT DOCUMENTS

| DE | 10341737 A1 | 4/2005 |
| EP | 1179941 A2  | 2/2002 |

(Continued)

OTHER PUBLICATIONS

Alcatel-Lucent: "Alcatel-Lucent OmniPCX Enterprise Communication Server: Delivering powerful, reliable and scalable IP communications to drive your 21st century business", 2007.

(Continued)

*Primary Examiner* — Nathan Mitchell
(74) *Attorney, Agent, or Firm* — Muncy, Geissler, Olds & Lowe, P.C.

(57) ABSTRACT

A system and method for achieving or assisting dynamic transfer of call support information across a network including at least a wireless portion coupled to a wireless communication device. The call support information providing the wireless communication device with updated caller identification and status or presence information by way of a service or server provisioned product and method.

7 Claims, 6 Drawing Sheets

(56) References Cited

U.S. PATENT DOCUMENTS

| | | | |
|---|---|---|---|
| 5,570,417 A | 10/1996 | Byers | |
| 5,577,100 A | 11/1996 | McGregor et al. | |
| 5,635,940 A | 6/1997 | Hickman et al. | |
| 5,848,128 A | 12/1998 | Frey | |
| 5,878,122 A | 3/1999 | White et al. | |
| 5,913,162 A * | 6/1999 | Gourdin et al. | 455/424 |
| 5,946,618 A | 8/1999 | Agre et al. | |
| 6,044,263 A | 3/2000 | Valentine et al. | |
| 6,188,762 B1 | 2/2001 | Shooster | |
| 6,205,126 B1 | 3/2001 | Moon | |
| 6,333,931 B1 | 12/2001 | LaPier et al. | |
| 6,564,261 B1 | 5/2003 | Gudjonsson et al. | |
| 6,618,590 B1 | 9/2003 | Howe | |
| 6,678,364 B2 | 1/2004 | Ruckart | |
| 6,687,362 B1 | 2/2004 | Lindquist et al. | |
| 6,697,858 B1 | 2/2004 | Ezerzer et al. | |
| 6,707,811 B2 | 3/2004 | Greenberg et al. | |
| 6,751,457 B1 * | 6/2004 | Martin | 455/424 |
| 6,775,375 B1 | 8/2004 | Bhusri | |
| 6,850,762 B1 | 2/2005 | Ala-Luukko et al. | |
| 6,917,610 B1 | 7/2005 | Kung et al. | |
| 6,937,873 B2 * | 8/2005 | Levy et al. | 455/521 |
| 7,039,164 B1 * | 5/2006 | Howe | 379/88.05 |
| 7,085,260 B2 | 8/2006 | Karaul et al. | |
| 7,110,772 B1 | 9/2006 | Wu | |
| 7,127,488 B1 | 10/2006 | Scott et al. | |
| 7,130,620 B2 * | 10/2006 | Forman et al. | 455/414.2 |
| 7,139,370 B1 | 11/2006 | Tse | |
| 7,257,837 B2 | 8/2007 | Xu et al. | |
| 7,274,786 B2 | 9/2007 | Fleischer, III | |
| 7,280,652 B2 | 10/2007 | Bocking et al. | |
| 7,369,650 B1 | 5/2008 | Bhusri | |
| 7,395,057 B2 * | 7/2008 | Awasthi et al. | 455/423 |
| 7,436,820 B2 | 10/2008 | Beck et al. | |
| 7,471,692 B1 | 12/2008 | Erickson | |
| 7,480,723 B2 | 1/2009 | Grabelsky et al. | |
| 7,529,231 B2 | 5/2009 | Soo et al. | |
| 7,548,611 B2 * | 6/2009 | Howe | 379/88.05 |
| 7,620,404 B2 | 11/2009 | Chesnais et al. | |
| 7,634,509 B2 | 12/2009 | Onyon et al. | |
| 7,701,883 B2 | 4/2010 | Beckemeyer | |
| 7,738,861 B2 | 6/2010 | Fournier | |
| 7,974,610 B2 * | 7/2011 | Nachum | 455/417 |
| 8,116,836 B2 * | 2/2012 | Ki | 455/575.9 |
| 8,391,848 B2 | 3/2013 | Guedalia et al. | |
| 2002/0099670 A1 | 7/2002 | Jakobsson | |
| 2002/0120760 A1 | 8/2002 | Kimchi et al. | |
| 2002/0129103 A1 | 9/2002 | Birkler et al. | |
| 2002/0169984 A1 | 11/2002 | Kumar et al. | |
| 2002/0193107 A1 | 12/2002 | Nascimento | |
| 2003/0013441 A1 * | 1/2003 | Bhogal et al. | 455/423 |
| 2003/0046404 A1 | 3/2003 | O'neill et al. | |
| 2003/0046405 A1 | 3/2003 | O'neill et al. | |
| 2003/0050051 A1 | 3/2003 | Vilander | |
| 2003/0060211 A1 | 3/2003 | Chern et al. | |
| 2003/0091024 A1 | 5/2003 | Stumer | |
| 2003/0115138 A1 | 6/2003 | Brown et al. | |
| 2003/0118175 A1 | 6/2003 | Hariri et al. | |
| 2003/0148790 A1 | 8/2003 | Pappalardo et al. | |
| 2003/0190025 A1 | 10/2003 | Okamura et al. | |
| 2004/0019539 A1 | 1/2004 | Raman et al. | |
| 2004/0037396 A1 | 2/2004 | Gray et al. | |
| 2004/0044771 A1 | 3/2004 | Allred et al. | |
| 2004/0143669 A1 | 7/2004 | Zhao et al. | |
| 2004/0156394 A1 | 8/2004 | Westman | |
| 2004/0165714 A1 | 8/2004 | Pinault | |
| 2004/0202117 A1 | 10/2004 | Wilson et al. | |
| 2004/0203643 A1 | 10/2004 | Bhogal et al. | |
| 2004/0213209 A1 | 10/2004 | O'connor et al. | |
| 2004/0229644 A1 | 11/2004 | Heie et al. | |
| 2004/0235509 A1 * | 11/2004 | Burritt et al. | 455/519 |
| 2005/0025043 A1 | 2/2005 | Mussman et al. | |
| 2005/0027867 A1 | 2/2005 | Mueller et al. | |
| 2005/0033852 A1 | 2/2005 | Tenhunen | |
| 2005/0036597 A1 | 2/2005 | Kobrosly et al. | |
| 2005/0059418 A1 | 3/2005 | Northcutt | |
| 2005/0070230 A1 | 3/2005 | Das et al. | |
| 2005/0070286 A1 * | 3/2005 | Awasthi et al. | 455/436 |
| 2005/0138571 A1 | 6/2005 | Keskar et al. | |
| 2005/0157858 A1 | 7/2005 | Rajagopalan et al. | |
| 2005/0163065 A1 | 7/2005 | Yule | |
| 2005/0182798 A1 | 8/2005 | Todd et al. | |
| 2005/0198031 A1 | 9/2005 | Pezaris et al. | |
| 2005/0198172 A1 | 9/2005 | Appelman et al. | |
| 2005/0198365 A1 | 9/2005 | Wei | |
| 2005/0221847 A1 | 10/2005 | Brehler et al. | |
| 2005/0249344 A1 | 11/2005 | Mueller et al. | |
| 2005/0273512 A1 | 12/2005 | Cho | |
| 2006/0018306 A1 | 1/2006 | Nishida et al. | |
| 2006/0018311 A1 | 1/2006 | Kobayashi et al. | |
| 2006/0023701 A1 | 2/2006 | Nishida et al. | |
| 2006/0026288 A1 | 2/2006 | Acharya et al. | |
| 2006/0029042 A1 | 2/2006 | Nishida et al. | |
| 2006/0029043 A1 | 2/2006 | Nishida et al. | |
| 2006/0029046 A1 | 2/2006 | Nishida et al. | |
| 2006/0031368 A1 | 2/2006 | Decone | |
| 2006/0040711 A1 * | 2/2006 | Whistler | 455/566 |
| 2006/0077932 A1 | 4/2006 | Takeda et al. | |
| 2006/0159456 A1 | 7/2006 | Gumaste et al. | |
| 2006/0168326 A1 | 7/2006 | Baldwin et al. | |
| 2006/0173961 A1 | 8/2006 | Turski et al. | |
| 2006/0205400 A1 | 9/2006 | Kiyomoto | |
| 2006/0209690 A1 | 9/2006 | Brooke et al. | |
| 2006/0236388 A1 | 10/2006 | Ying et al. | |
| 2006/0246877 A1 | 11/2006 | Kashanian et al. | |
| 2006/0248146 A1 | 11/2006 | Wilk | |
| 2006/0270392 A1 | 11/2006 | Scott et al. | |
| 2006/0270400 A1 * | 11/2006 | DaSilva et al. | 455/423 |
| 2007/0005770 A1 | 1/2007 | Hansen et al. | |
| 2007/0016682 A1 | 1/2007 | Hodgson | |
| 2007/0060100 A1 | 3/2007 | Watler et al. | |
| 2007/0064607 A1 | 3/2007 | Moon et al. | |
| 2007/0071006 A1 | 3/2007 | Bosch et al. | |
| 2007/0112964 A1 | 5/2007 | Guedalia et al. | |
| 2007/0143397 A1 | 6/2007 | Guedalia et al. | |
| 2007/0162350 A1 | 7/2007 | Friedman | |
| 2007/0281676 A1 | 12/2007 | Borras et al. | |
| 2007/0287430 A1 | 12/2007 | Hosain et al. | |
| 2008/0013531 A1 | 1/2008 | Elliott et al. | |
| 2008/0037524 A1 | 2/2008 | Koch et al. | |
| 2008/0056208 A1 | 3/2008 | Hinrikus et al. | |
| 2008/0056235 A1 | 3/2008 | Albina et al. | |
| 2008/0070579 A1 | 3/2008 | Kankar et al. | |
| 2008/0076409 A1 | 3/2008 | Hinrikus et al. | |
| 2008/0096592 A1 | 4/2008 | Waytena et al. | |
| 2008/0139210 A1 | 6/2008 | Gisby et al. | |
| 2008/0159261 A1 | 7/2008 | Bessis | |
| 2008/0159515 A1 | 7/2008 | Rines | |
| 2008/0166999 A1 | 7/2008 | Guedalia et al. | |
| 2008/0167019 A1 | 7/2008 | Guedalia et al. | |
| 2008/0167020 A1 | 7/2008 | Guedalia et al. | |
| 2008/0167039 A1 | 7/2008 | Guedalia et al. | |
| 2008/0181165 A1 | 7/2008 | Guedalia et al. | |
| 2008/0188227 A1 | 8/2008 | Guedalia et al. | |
| 2008/0192910 A1 | 8/2008 | Guedalia et al. | |
| 2008/0244023 A1 | 10/2008 | Guedalia et al. | |
| 2008/0248795 A1 * | 10/2008 | Petersen et al. | 455/423 |
| 2008/0263170 A1 | 10/2008 | Caron et al. | |
| 2008/0305782 A1 | 12/2008 | Guedalia et al. | |
| 2009/0190738 A1 | 7/2009 | Guedalia et al. | |
| 2010/0080376 A1 | 4/2010 | Hartley et al. | |
| 2011/0312308 A1 * | 12/2011 | Willey | 455/414.1 |

FOREIGN PATENT DOCUMENTS

| | | |
|---|---|---|
| EP | 1517256 A2 | 3/2005 |
| EP | 1701569 A1 | 9/2006 |
| GB | 2391135 A | 1/2004 |
| WO | 9723083 A1 | 6/1997 |
| WO | 9847298 A2 | 10/1998 |
| WO | 9934628 A1 | 7/1999 |
| WO | 0198867 A2 | 12/2001 |
| WO | 0215030 A1 | 2/2002 |
| WO | 0221779 A1 | 3/2002 |

(56) References Cited

FOREIGN PATENT DOCUMENTS

| WO | 0239237 | A2 | 5/2002 |
|---|---|---|---|
| WO | 03032613 | A1 | 4/2003 |
| WO | 03094011 | A1 | 11/2003 |
| WO | 2005065296 | A2 | 7/2005 |
| WO | 2006039552 | A2 | 4/2006 |
| WO | 2006044654 | A2 | 4/2006 |
| WO | 200705124 | | 1/2007 |
| WO | 2007001850 | A1 | 1/2007 |
| WO | 2007025373 | A1 | 3/2007 |
| WO | 2007109559 | A2 | 9/2007 |
| WO | 2008013642 | A2 | 1/2008 |

OTHER PUBLICATIONS

Case Study, Intel Centrino, Mobile Technology, Intel Xeon Processor MP, Shanghai GM, Seamless Communications, Jan. 2006, http://www.intel.com/netcomms/technologies/voice/310998.pdf.

Griffin, et al., "Integrating SIP, Presence and FTP to provide Wireless Multimedia Messaging", Wireless Communications and Networking Conference, 2004 IEEE Communications Society, vol. 4, pp. 2581-2586, 2004.

Handley, et al., "RFC 2543, SIP: Session Initiation Protocol" IETF Standard, Internet Engineering Task Force, pp. 1-153, Mar. 1999.

Ho, Colman: "Voice Over Internet Protocol (VoIP) Overview", Presentation to TSACC, Mar. 23, 2004; http://www.isacc.ca/isacc/_doc/ArchivedPlenary/TSACC-04-31305.pdf.

Intel Communications Alliance, "TeleSym and Intel Deliver Voice-over-internet-Protocol (VoIP) Enterprise Communication Solution", Jun. 2004, http://www.intel.com/network/csp/pdf/9003wp.pdf.

International Search Report and Written Opinion—PCT/US2007/086063, International Searching Authority—US, Alexandria, VA, Oct. 14, 2008 (Later publication of revised version of ISR).

International Search Report and Written Opinion—PCT/US2008/050508, International Searching Authority—European Patent Office, May 1, 2009.

International Search Report and Written Opinion—PCT/US2008/050615, International Searching Authority—European Patent Office, Nov. 18, 2008.

International Search Report and Written Opinion—PCT/US2008/053685, International Searching Authority—US, Alexandria, VA, Aug. 11, 2008.

International Search Report and Written Opinion—PCT/US2008/058909, International Searching Authority—European Patent Office, Dec. 30, 2008.

International Search Report and Written Opinion—PCT/US2008/065345, International Searching Authority—European Patent Office, Jul. 3, 2008.

Lundqvist, Janne; et al., "Messaging-over-IP—A network for messaging and information services"; http://www.ericsson.com/ericsson/corpinfo/publications/review/1999_03/files/1999035.pdf.

Mmusic WG Handley/Schulzrinne/Schooler ISI/Columbia U/Caltech: "SIP: Session Initiation Protocol; draft-ietf-mmusic-sip-04.txt;" IETF Standard-Working-Draft, Internet Engineering Task Force, IETC, CH, vol. mmusic, No. 4, Nov. 11, 1997, XP015023259, ISSN: 0000-0004, pp. 1-83, p. 8, line 1-p. 9, line 7 p. 53, line 11-p. 54, line 10.

NST, New Standard Telephony, Convergence Simplified, Company Profile, NST 2005, http://www.ns-tel.com/files/NST_Company_Profile.pdf.

Petrie, Pingtel Corp., "A Framework for SIP User Agent Profile Delivery", draft-ietf-sipping-config-framework-02.txt, IETF Standard-Working-Draft, Internet Engineering Task Force, No. 2, pp. 1-22, 2004.

Rosenberg J et al:RFAC 3261: "SIP: Session Initiation Protocol" 20020601; 20020600, Jun. 1, 2002, pp. 1-269, XP015009039.

Schulzrinne, H., et al., "Dynamic Host Configuration Protocol (DHCPv6) Options for Session Initiation Protocol (SIP) Servers" RFC 3319, IETF Standard, Internet Engineering Task Force, IETF, CH. Jul. 1, 2003, XP015009189; ISSN: 0000-0003.

Shanmugham, et al., "Media Resource Control Protocol Version 2 (MRCPv2)", IETF Standard-Working-Draft, Internet Engineering Task Force, IETF, vol. Speechsc, No. 6, pp. 1-176, 2005.

Singh, Kundan Narendra; Thesis, "Reliable, Sealable and Interoperable Internet Telephony", Columbia University, 2006, http://www1.cs.columbia.edu/~kns10/publication/thesis.pdf.

Sinnreich, et al., "SIP Telephony Device Requirements and Configuration", draft-sinnreich-sipdev-req-07.txt, IETF Standard-Working-Draft, Internet Engineering Task Force, No. 7, pp. 1-37, 2005.

Sinnreich, et al., "SIP Telephony Device Requirements and Configuration", draft-sinnreich-sipdev-req-08.txt, IETF Standard-Working-Draft, Internet Engineering Task Force, IETF, CH, No. 8, Oct. 1, 2005, XP015043067 ISSN:0000-0004.

SIP Connect, "CableLabs Proposal for SIP Connect 1.1", 2007, http://www.sipforum.org/component/option.com_docman/task.doc_view/gid.149/Itemid.75/.

* cited by examiner

TELECOMMUNICATION CALL SUPPORT FOR MOBILE DEVICES WITH PRESENCE FEATURES

CROSS-REFERENCE TO RELATED APPLICATIONS

This application is a divisional application of U.S. patent application Ser. No. 12/135,420, entitled "Telecommunication Call Support for Mobile Devices with Presence Features," filed Jun. 9, 2008, which claims priority to U.S. Provisional Patent Application No. 60/942,557 filed Jun. 7, 2007, entitled "A method for receiving a call," and U.S. Provisional Patent Application No. 60/947,963, entitled "A method for presenting contact updates from a server to a client," filed on Jul. 4, 2007. This application is also a continuation-in-part of U.S. patent application Ser. No. 11/948,404, entitled "Methods and Systems of Providing Status Message Calling Features," filed on Nov. 30, 2007, and U.S. patent application Ser. No. 12/130,419, entitled "Methods and Systems for Propagating Information Across a Network," filed on May 30, 2008. Each of the above applications is incorporated herein by reference.

TECHNICAL FIELD

The present invention relates to telecommunication processing in general, and more particularly to call support for mobile communication devices having presence features.

BACKGROUND

It is commonly accepted today that users keep and rely on stored "phonebook" information in or on their mobile communication devices (e.g., cellular telephones). The phonebook is typically entered by the user of a mobile device using a user interface of the device such as a keypad. The user's contacts, such as friends, family, and frequently-called entities are associated in the phonebook with one or more phone numbers and other information that is then stored in a memory device, e.g. a flash memory, on the device. This enables easy and convenient dialing of the user's contacts from the user's device without the need to remember and re-enter the full phone number for each contact when the user wishes to call the contact.

In addition, it is common for mobile devices to include a display such that an incoming call identifies to the user of the device who the incoming call is from if the incoming call is from a contact of the user that is in the user's phonebook. The incoming call is simply matched to a phone number stored in the phonebook, and the incoming caller's name is shown to the user on the display of the mobile device rather than displaying the phone number of the caller. Alternately, even for unknown callers, the name and/or phone number of the caller can be displayed on the callee's mobile device through a "caller ID" feature.

More features for identifying the identity of callers are desired. And more features for determining the status of those in one's phonebook or contacts list are also desired. The present disclosure provides systems and methods for enhancing and creating such new features.

SUMMARY

The present disclosure includes numerous embodiments and preferred features of systems and methods for improving or facilitating dynamic presence functions on mobile communication devices such as cellular or wireless telephone devices. The present systems and methods include one or more where such mobile devices are coupled to a cellular or wireless network, or a portion of a wireless network being a cellular or wireless network. The cellular or wireless network including a server or other communication processor for provisioning calls, including by voice, data, packet, circuit, or combination of switching modalities between the mobile device and at least one other communication device. The at least one other communication device can include another wireless or cellular device, another communication processor device, computer, or similar apparatus that enables a user of the mobile device to communicate with another user of the other device.

In some embodiments, the user of the mobile device and another user of the other communication device communicate over a network including a wireless component and a wired component such as the Internet, and where a voice over IP portion of the communication between the users takes place. Packets of data or information relating to the call between the users represents voice data and other packets of data or information relating to the call between the users represents control or auxiliary, data such as for call set up and caller ID. In another embodiment, a service such as Skype® is employed to service a call between a computer coupled to one side of a network and a mobile device coupled to another side of the network.

Additional features and advantages of the invention will become apparent from the following drawings and detailed description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout. In the accompanying drawings.

DETAILED DESCRIPTION

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

The terms "include", "comprise" and "have" and their conjugates as used herein mean "including but not necessarily limited to."

Figure 1:
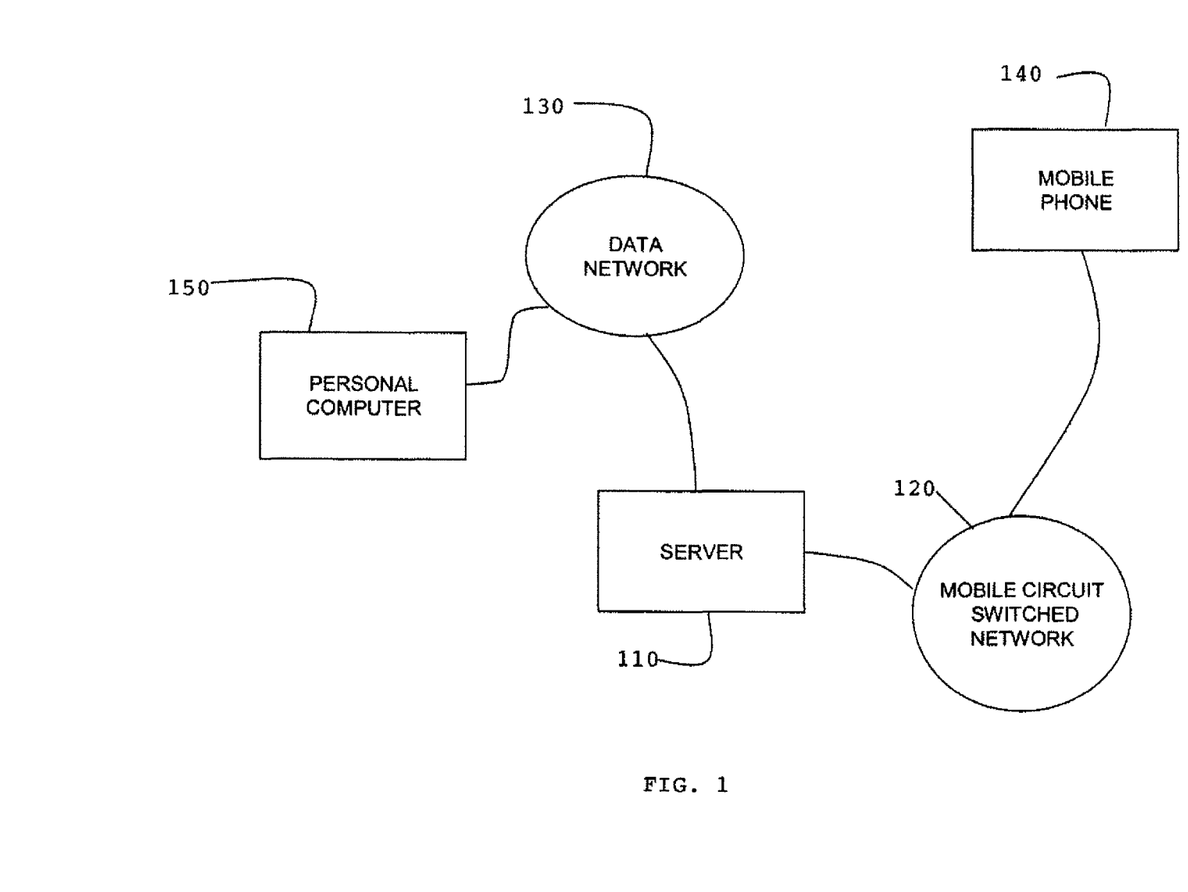
FIG. 1 illustrates an exemplary communication network and associated communication devices according to one or more embodiments hereof.

Referring to FIG. 1, an exemplary block diagram for a communication system 100, and is provided in simplified form. The system is operative according to one or more of the preferred methods described herein. The system illustrated represents an embodiment according to the present discussion, but can be modified as would be appreciated by those skilled in the art. For example, equivalent corresponding components and elements could be substituted for those shown, sometimes under a different name. Also, other components could be added, including auxiliary components and elements beyond what is shown for the purpose of illustration. Specific examples of related embodiments are provided by the present applicants in earlier patent applications covering communications systems, some of which are referenced herein, and all of which are incorporated by reference.

The system 100 includes for example a communications server 110, which can be based on a server used in the telecommunications field or a server specifically assembled for the present purpose. The server 110 typically includes at least one processor capable of executing computer-readable instructions, the processor coupled to or having access to a memory or storage or database apparatus and an input/output apparatus as well as at least one communications port for communicating with other components over a communication channel.

In the shown illustrative embodiment, the server 110 has connections to a mobile circuit switched network 120. The network connection can be accomplished in one of the ways known to those skilled in the art, and can include at least a portion coupling server 110 to another server or switch within the mobile circuit switched network (not shown).

A mobile communications device such as a mobile or cellular phone 140 is designed to communicate through the mobile circuit switched network. Previous patent applications by the present inventors, incorporated herein by reference, describe ways to couple a mobile device to the network 120. However, those skilled in the art will appreciate several known ways to establish such coupling between mobile phone 140 and network 120.

Mobile phone 140 can be of a number of formats. In some embodiments, mobile phone 140 includes a user interface, perhaps even controlled by an operating system running on a processor of mobile phone 140. Also, mobile phone 140 can include a visual display unit, such as a LED or LCD or other electronic display, which shows the user of mobile phone 140 information relating to the function and operation of the mobile phone 140. Embodiments hereof will discuss some of the uses of the present system and methods and how the mobile phone 140 is used to display information to its user. Audible inputs and outputs of mobile phone 140 are also useful for voice communication with another party.

Server 110 is also connected to our coupled to a data network 130. Data network 130 can include one or many nodes therein, and in some embodiments, at least a portion of said network 130 includes the Internet or portions thereof. However, other networks can be used for the present purpose to carry data packets and information over the network. Packet switched networks ate suitable for some or all embodiments hereof.

A personal computer 150 is coupled to the data network 130. By the present exemplary illustration it is not meant to limit the present disclosure to traditional present-day personal computing devices, but some embodiments hereof do in fact utilize such computers (sometimes called "PCs") as a communications apparatus. Other devices such as micro computers, workstations, desktop computers, notebook computers, and communication appliances are presently available and can be adapted for this purpose. The exemplary PC 150 typically includes a processor capable of executing computer-readable instructions, the processor coupled to or having access to a memory or storage or database apparatus and an input/output apparatus as well as at least one communications port for communicating with other components over a communication channel. In one or more embodiments, the PC 150 also includes a communications or telephony interface such as a microphone and a speaker system. The microphone and speaker system can permit audible (e.g., voice) interaction between a user of the PC 150 and the rest of the present system, usually by undertaking an analog to-digital process (connected to the microphone) and a digital-to-analog process (connected to the speaker system).

In operation, system 100 achieves at least a function of establishing a communications connection between mobile device 140 and PC 150. The communication in some embodiments or all embodiments can be initiated by either party. For most contexts, reference to communication between the communications devices (e.g., mobile phone 140, PC 150) corresponds to communication between users of the devices.

Communication over the networks (e.g., mobile circuit switched network 120, data network 130) can use one or more of the know communication protocols available to those skilled in the art. In addition, modified protocols or specialized protocols as necessary can be employed as well. More than one protocol can be used in the overall system to accomplish the present purpose. In some examples the communication protocol is influenced by the network over which the communication is to take place. In one or more embodiments, the Internet protocols (e.g., TCP/IP) are used to carry data communication. In other embodiments, the SS7 protocol is used to carry other information.

Turning to an exemplary method of operation of the system described above, FIG. 2 illustrates one embodiment of such a method. It is to be appreciated and understood that numerous other sub-steps than those shown and auxiliary steps and acts are often included in a specific implementation, but the present discussion is limited for the purpose of clarity and brevity, which is not intended to limit the present scope of the acts and steps and methods to be implemented in operational scenarios. Also, the sequence of steps described can be modified where appropriate or expedient, depending on the application at hand.

Figure 2:
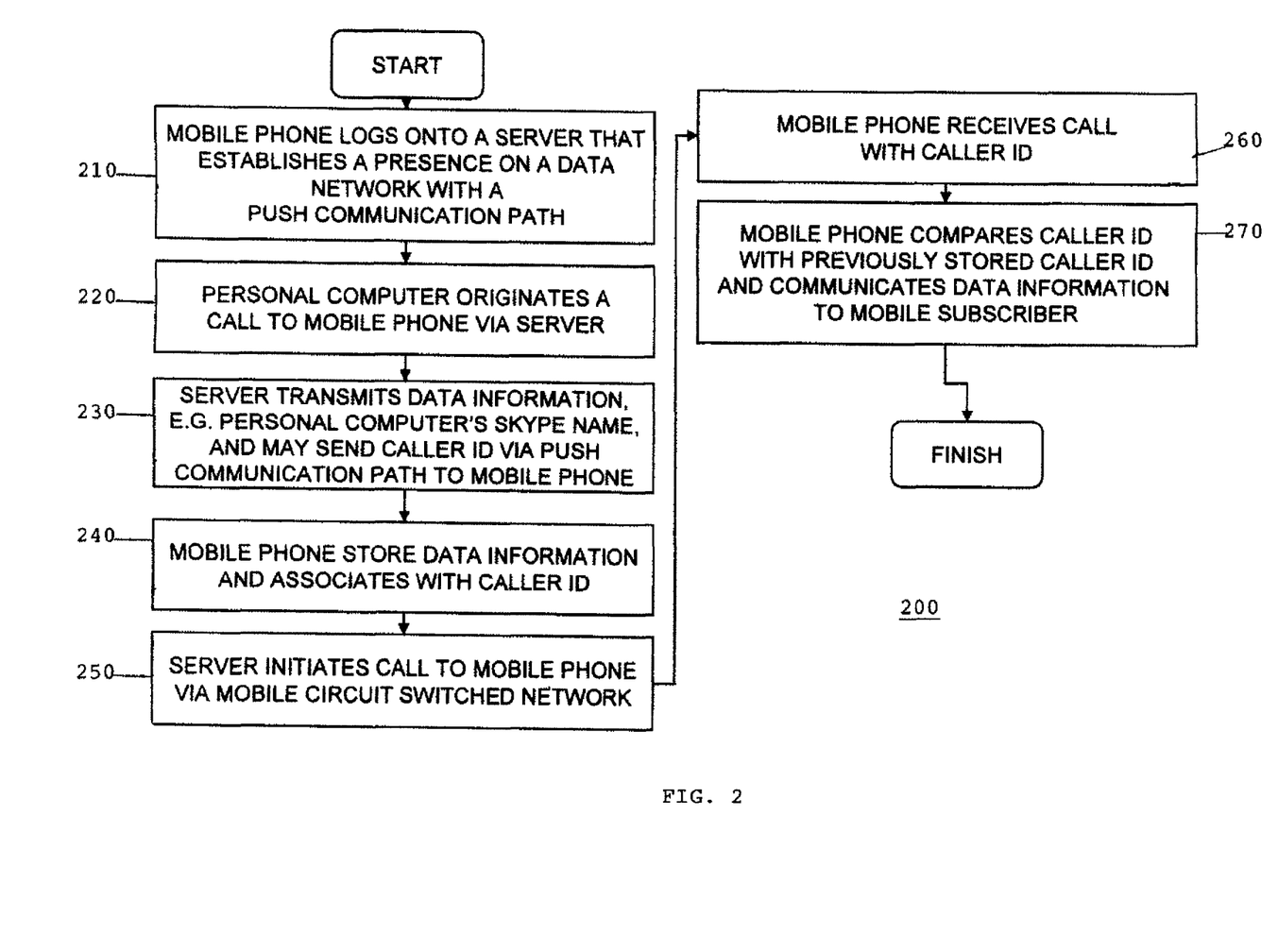
FIG. 2 illustrates an exemplary method for delivery of contact information and caller ID data to a mobile phone user according to one or more embodiments hereof.

At the logical beginning of the communication process step 210 includes mobile phone 140 logging into a server that establishes a presence on a data network 130 with a push communication path. In some embodiments, the server can be server 110 shown in FIG. 1.

Next, at step 220 personal computer (PC) 150 originates a call to mobile phone 140 via server 110. It is notes once again, that such connections can in actual practice occur through a number of intermediate network nodes or servers or switches as appropriate.

In step 230 server 110 transmits data information, e.g., personal computer 150 or its user's code or identifier (e.g., a Skype® name) or other suitable user identification data to mobile phone 140. The act of transmission can include intermediate steps of signal processing, compression, encryption, conditioning, formatting, packaging, etc. Also, server 110 may send caller ID information to mobile phone 140 by way of a "push" communication path to mobile phone 140.

Mobile phone 140 receives the information sent from server 110 and stores some or all of said received information. For example, mobile phone 140 can store the received data in a memory unit such as a Flash memory device on mobile phone 14. The information can be associated with the caller ID information received by mobile phone 140.

Subsequently, or substantially concurrently, as called for, server 110 initiated a call (e.g., voice connection) from PC 150 to mobile phone 140. The call can comprise data transmitted over the mobile circuit switched network 120. It is understood in the present context that those skilled in the art could opt to use the same server 110 for both the push/data portion of the present steps and for the voice connectivity portion of the present steps. However, the present system and method are not so limited, and those skilled in the art can opt to employ two (or more) servers or communications processing machines for performing the push/data and the voice connectivity portions respectively.

Mobile phone 140 receives the call and the caller ID at step 260, not necessarily at the same time or in any particular sequence.

At step 270 the mobile phone 140 compares the received caller ID to previously-stored caller ID information. For example information stored in a memory unit such as a Flash memory unit on the mobile phone 140. The data information is then communicated to a user of the mobile phone 140.

In some embodiments the data information is communicated visually on the display unit mentioned above. In other embodiments other sensory interfaces, such as an audible interface, could be used for communicating the data information to the user.

Figure 3:
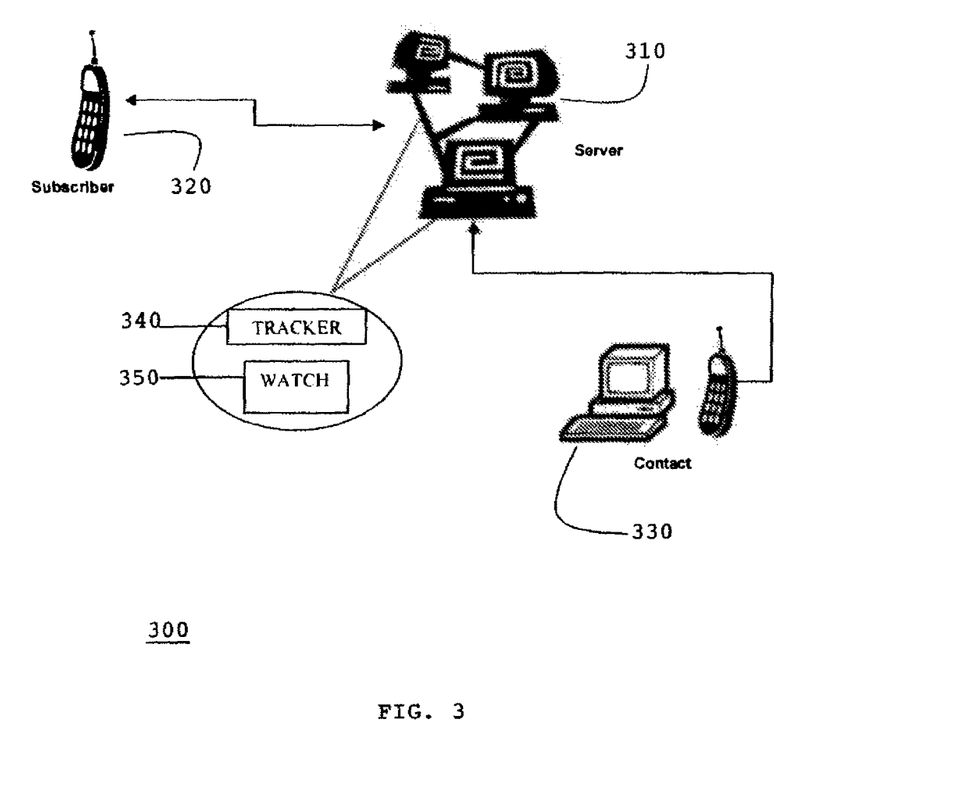
FIG. 3 illustrates another exemplary communication network and associated communication devices according to one or more embodiments hereof.

To further illustrate the way in which the present systems and methods can improve mobile (and mixed) communications, consider illustrative exemplary FIG. 3 showing a communication system according to one or more embodiments hereof.

A server 310 or cluster of servers performing communications functions are coupled to at least one communications port, similar to the arrangement described earlier with respect to server 110. Through the communication network or networks, server 310 is in communication with a subscriber 320 of a mobile device (which can also be effectively interchangeably used with the subscriber 320 thereof where appropriate). In addition, server 310 is in communication with a contact 330 using another communications device, e.g., a personal computing device as previously described (which can be effectively interchangeably used with the contact 330 thereof where appropriate).

Server 310 is further coupled to, and in some embodiments can include, a tracking module or component, or tracker 340 to be described below. In addition, server 310 can include or be coupled to a watch module or component, or watcher 350 to be described below. Note that the watcher 350 can merely be a component or module of the tracker 340, but may be implemented as a separate component.

The tracker 340 and watcher 350 can be implemented as best fit for a particular application. In some embodiments, the tracker 340 and watcher 350 include hardware and/or software that enable computer-readable instructions and electronic logic operations to perform tracking and watching functions, as discussed herein. For example, separate tracking and watching software modules may be installed and run on server 310 or an associated machine to yield signals and results in a computing apparatus (e.g., a server) or processor to carry out the present steps and comprise the present system. As a further example, dedicated or substantially principally dedicated processor hardware can be included in or in association with server 310 to provide the tracking and watching features hereof.

Figure 4:
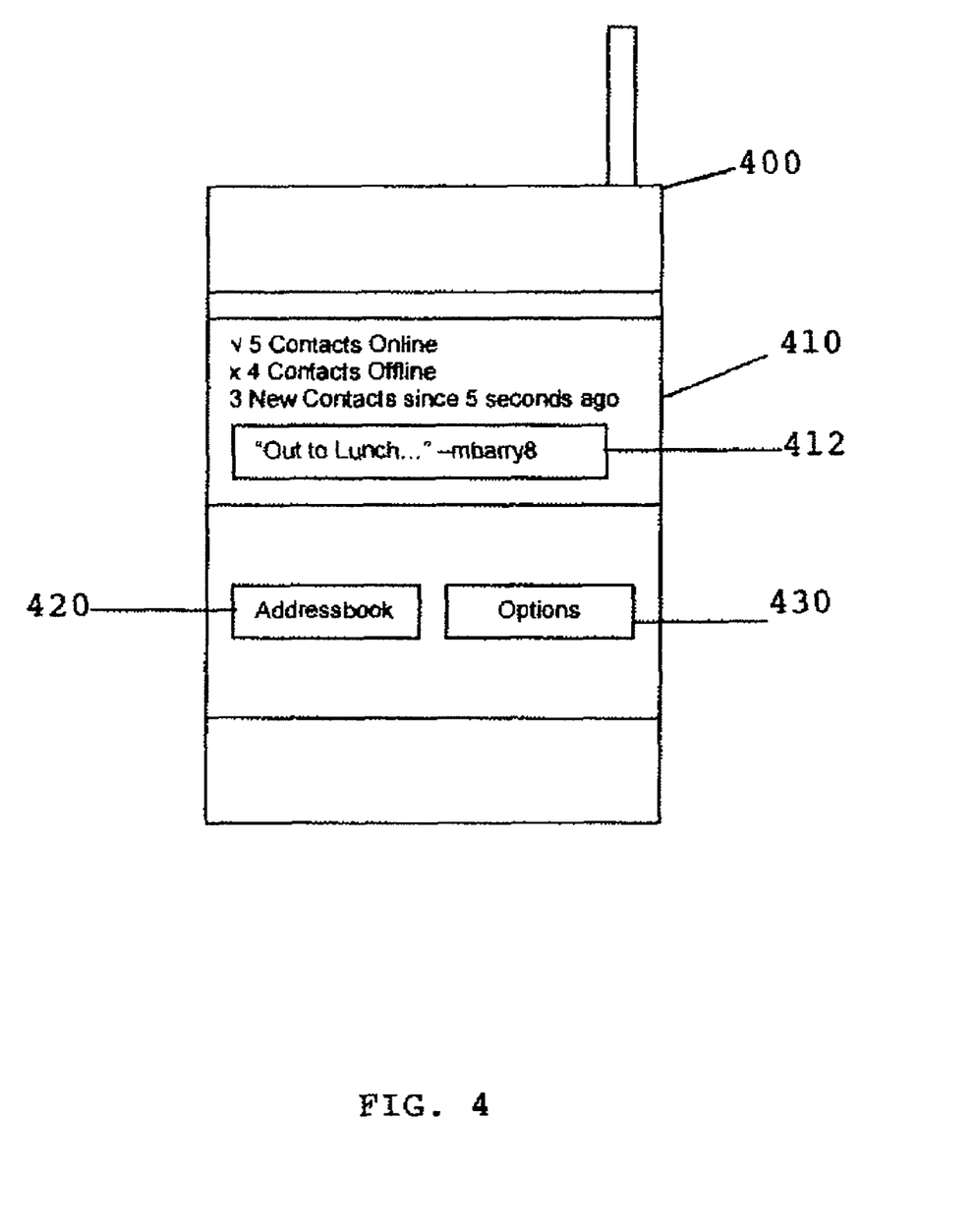
FIG. 4 illustrates another exemplary method for delivery of update and other contact presence data to a user of a mobile device.
Figure 5:
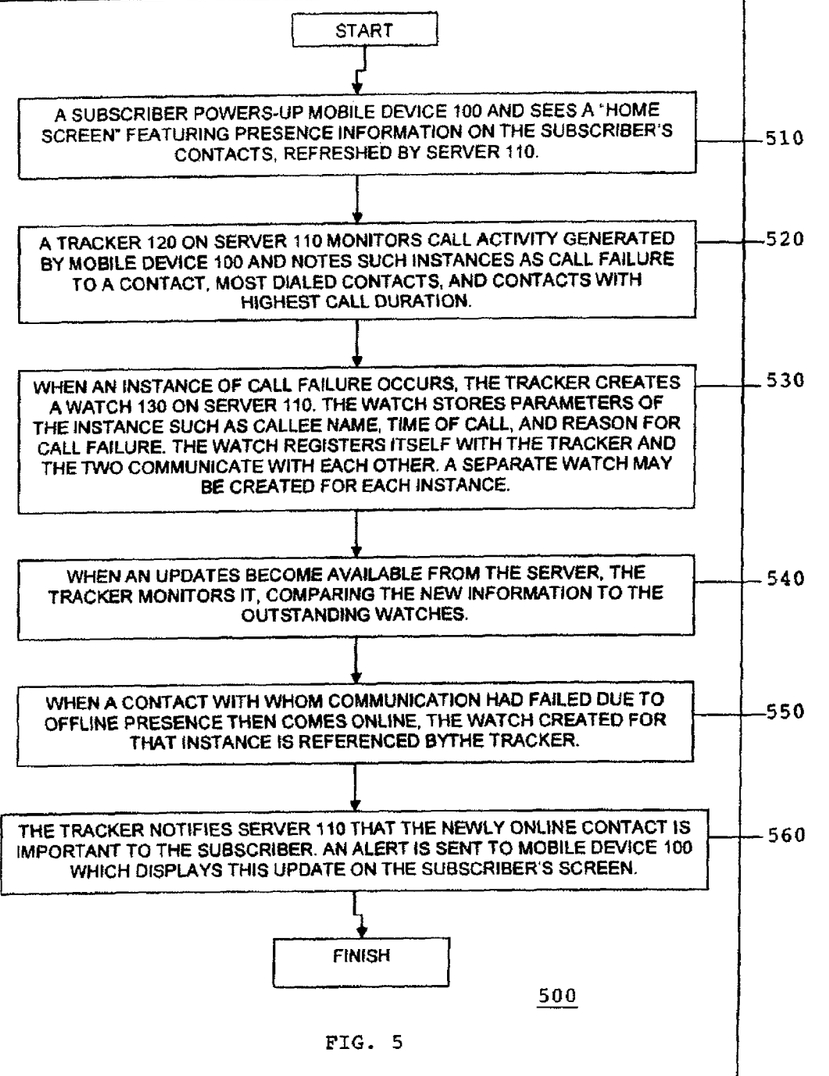
FIG. 5 illustrates an exemplar process for tracking call failure according to one or more embodiments hereof.

Reference is now made to the mobile device 400 of FIG. 4, and to its operation described illustratively in FIG. 5. Once powered up, the subscriber device 320 presents a "Home Screen" on its visual display unit. The concept of a visible display unit has been discussed earlier and can be generalized as known to those skilled in the art. The Home Screen presents typically: a menu, a set of graphical user options or controls, some status information, and other operational and functional messages and icons.

Subscriber mobile device 400, which can be representative of mobile devices 140 and 320 above in certain embodiments, is illustrated in FIG. 4 to include a simplified user interface including a graphical visual display unit. The mobile device 400 provides a graphical visual output as discussed before and as known to those skilled in the art. The visual output can include for example the status of the subscriber's contacts 410. The subscriber's contact status portion 410 can in turn include useful information such as: 5 user contacts are presently online; 4 user contacts are offline; and 3 new contacts have joined or been added in the last five seconds. Furthermore, one or more of the user's contacts' presence status can be displayed in a presence display portion 412 of the Home Screen. The Home Screen can further include portions relating to the user's phonebook 420 and device options 430.

Some embodiments hereof provide active touch pads, touch-sensitive screens, or buttons, scroll wheels, and other user interaction apparatus, some or all of which can be adapted from presently-known technologies for human-device interaction and user interface design.

FIG. 5 illustrates an exemplary process for updating information on a subscriber's mobile device. There is little or no substantial difference in the present exemplary discussion between an owner, a user, and a subscriber unless the specific context so implies, in that they are generally human operators of the devices (e.g., mobile communication devices or personal computing devices). It should however be understood that an indirect use and operation of the devices is possible, and that a machine can be made to operate or use another machine or an output or result thereof, for example in automated systems. These are all generally included within the present scope.

In step 510 a subscriber (e.g., a person) powers-up or actuates his or her mobile device. The mobile device and its user can for this purpose be interchangeably referred to as 320 as seen in simplified FIG. 3. The activation or power-up can include a step of connecting the device so a source of power (e.g., a battery) and pressing an appropriate button (e.g., a power button), and may further comprise making appropriate start-up sequence operations to activate the subscriber's mobile device 320.

Upon startup, the Home Screen referenced above will appear to the user. The Home Screen will receive presence information from the network and/or server as discussed herein and in the references by the present inventors which are hereby incorporated. The presence information and contact status information are useful to the user of a mobile device to inform the user that certain of his or her friends or colleagues are in various states of availability for communication. Step 510 ensures that the presence information is dynamically up to date and refreshed as necessary by the server to indicate a current state of the contacts.

Tracker 340 on server 310 tracks or monitors call activity generated by mobile device 320 and notes such instances as: call failure to a contact, most dialed contacts, and contacts with highest call durations and totals. The tracker 340 can of course monitor the opposite or converse of these conditions and other conditions as required by the implementation and as needed to make a determination of which contacts are of certain significance. Tracker 340 itself or cooperatively can thus keep a log or an accounting to rank contacts of the user in some order if needed. In some embodiments, the user's most relevant or most called or most needed contacts are afforded special significance above those that the user rarely calls or speaks with very little.

In step 530, when an instance of call failure occurs, the tracker creates a "watch" 350 to watch for the status of the contact with which the call failure occurred. The watcher 350 can store parameters of the instance such as the callee's name and time of call or call failure, as well as a reason for the call failure. The watcher 350 registers itself with the tracker 340 and the watcher 350 and tracker 340 communicate by exchanging information, signals, and data as necessary. Again, the watcher 350 can be implemented as part of the tracker 340 in some embodiments. A separate watch by watcher 350 can be instantiated for each instance of a call failure. That is, if two calls had failed, two instances of a watch can be set up to monitor for future activity and status relevant to the two failed calls.

When and if update information is delivered to the mobile device 320 from server 310 the tracker 40 monitors the updated information as illustrated in step 540.

In step 550, when a contact with whom communication had failed due to offline presence then comes online, the watch created for that instance in referenced by the tracker 340.

In step 560 the tracker 340 notifies the server 310 that the newly-online (or restored) contact is important or significant to the subscriber 320. An alert is sent to subscriber mobile device 320 which displays this update on the Home Screen discussed earlier.

Figure 6:
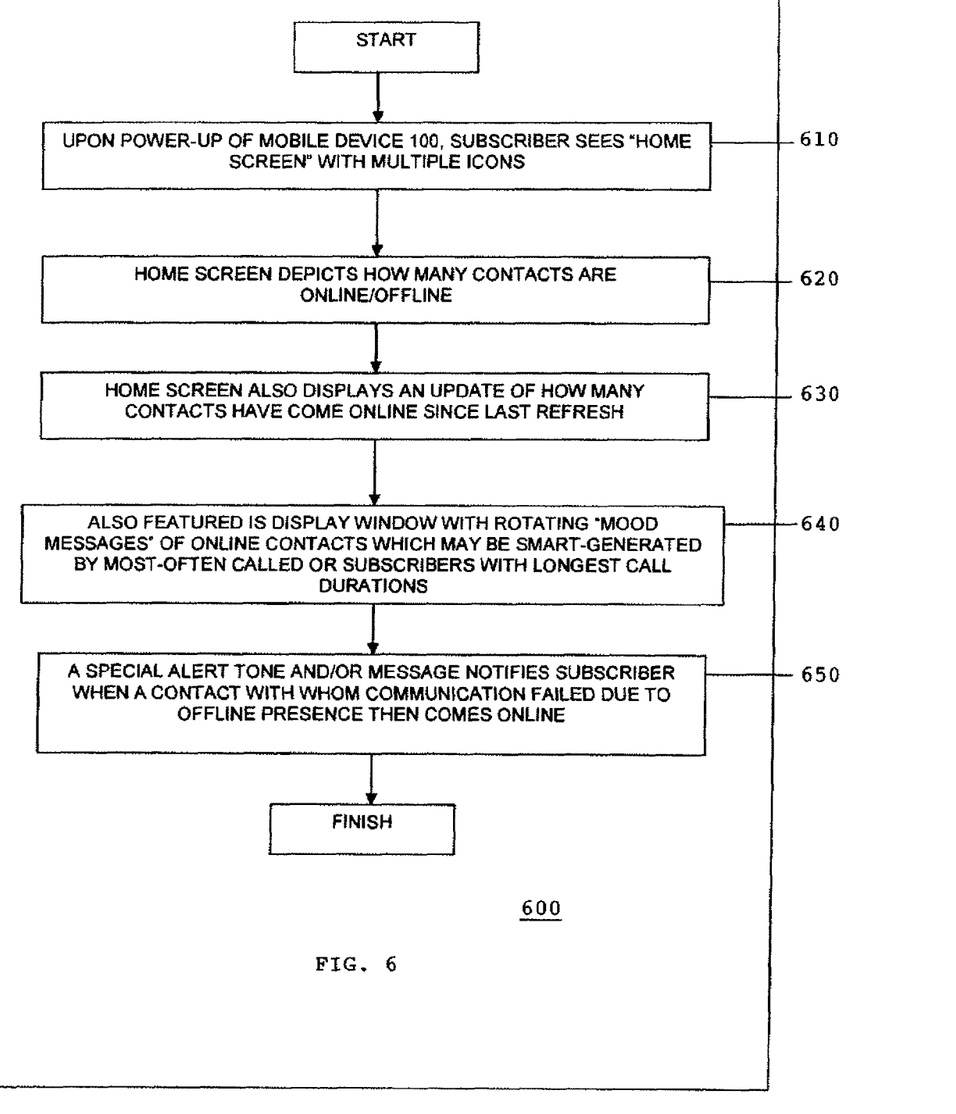
FIG. 6 illustrates another exemplary process for tracking and responding to call failure according to one or more embodiments hereof.

FIG. 6 illustrates an exemplary process 600 for updating contact information on a mobile subscriber's device. As before, the mobile communication device 320 can include a Home Screen on which the following indications take place.

In step 610, upon powering up the mobile device as discussed earlier, the subscriber is presented with a home screen interface indicative of information relevant to the subscriber, the mobile device, and the subscriber's contacts.

In step 620, the device indicates to the subscriber or user the number of contacts, type, status, and other information relating to the contacts. The contacts may correspond to entries in a subscriber's stored phonebook, or to entries in a database kept on or in the communication network.

In step 630, the device (e.g., in the home screen) indicates to the subscriber how many new or newly-available contacts have come online since a last refresh operation or update operation.

In step 640, a revolving or rotating or cycling "mood message" as discussed in earlier and related applications by the present inventors, is presented. In some embodiments, the messages can indicate a condition or status of the contacts. In some embodiments the messages indicate the status or condition of the subscriber's most relevant (or selected) contacts. These can be the contacts most often called or otherwise deemed of special significance as discussed earlier. The messages may revolve, rotate or cycle through a visible portion of the display, for example if there is insufficient space or resolution to conveniently display all mood or status information for the selected contacts concurrently.

In step 650, a special alert or tone or other audible or visual indication or message notifies the subscriber when a contact with whom communication had failed due to offline presence becomes available or online. A special contact can have a special or expedited or highlighted alert presented to indicate a special significance of the special contact's return to service. The subscriber can then re-establish connection with or redial the special contact.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

What is claimed is:

1. A method for managing call failures on a mobile communication device, comprising:
    determining that a call between the mobile communication device and a contact over a wireless connection has failed;
    receiving, after the call failure determination on the mobile communication device, status information from a server that indicates that at least one triggering condition that caused the call failure has been resolved or eliminated, wherein the at least one triggering condition is associated with an identity parameter of the contact; and
    prompting, in response to the received status information, a user of the mobile communication device to re-attempt the call between the mobile communication device and the contact.

2. The method of claim 1, wherein the at least one triggering condition is associated with a time at which the call failed.

3. A method for tracking call failures of a mobile communication device on a server, comprising:
    monitoring, on the server, call activity of the mobile communication device;
    determining, based on the monitoring of the call activity, that a call between the mobile communication device and a contact over a wireless connection has failed;
    storing at least one triggering condition indicative of an expected causation for the call failure, wherein the at least one triggering condition is associated with an identity parameter of the contact;
    determining that the at least one triggering condition that caused the call failure has been resolved or eliminated; and
    transmitting status information to the mobile communication device that indicates that the at least one triggering condition that caused the call failure has been resolved or eliminated.

4. The method of claim 3, wherein the storing further stores identification information of the contact and/or a time at which the call failure occurred.

5. The method of claim 3,
    wherein the at least one triggering condition corresponds to the contact transitioning from an online status to an offline status, and
    wherein the determination that the at least one triggering condition that caused the call failure has been resolved or eliminated corresponds to a detection that the contact has re-established the online status.

6. A mobile communication device configured to manage call failures, comprising:
   a memory storing computer-readable instructions; and
   a processor configured to execute the computer-readable instructions, the computer-readable instructions causing the processor to:
      determine that a call between the mobile communication device and a contact over a wireless connection has failed;
      receive, after the call failure determination, status information from a server that indicates that at least one triggering condition that caused the call failure has been resolved or eliminated, wherein the at least one triggering condition is associated with an identity parameter of the contact; and
      prompt, in response to the received status information, a user of the mobile communication device to re-attempt the call between the mobile communication device and the contact.

7. A server configured to track call failures of a mobile communication device, comprising:
   a memory storing computer-readable instructions; and
   a processor configured to execute the computer-readable instructions, the computer-readable instructions causing the processor to:
      monitor call activity of the mobile communication device;
      determine, based on the monitoring of the call activity, that a call between the mobile communication device and a contact over a wireless connection has failed;
      store at least one triggering condition indicative of an expected causation for the call failure, wherein the at least one triggering condition is associated with an identity parameter of the contact;
      determine that the at least one triggering condition that caused the call failure has been resolved or eliminated; and
      transmit status information to the mobile communication device that indicates that the at least one triggering condition that caused the call failure has been resolved or eliminated.

* * * * *